Patented Feb. 11, 1936

2,030,802

UNITED STATES PATENT OFFICE 2,030,802

METHOD OF CATALYTIC OXIDATION OF TURPENTINE OILS

Walther Schrauth, Berlin-Dahlem, Germany, assignor to Deutsche Hydrierwerke Aktiengesellschaft, Berlin-Charlottenburg, Germany, a corporation of Germany No Drawing. Application May 18, 1934, Serial No. 726,301. In Germany May 29, 1933

9 Claims. (Cl. 260—116)

The present invention relates to the production of maleic acid and has for an object to provide an effective method of producing maleic acid from turpentine oils. Another object is to provide an effective maleic acid product.

The invention provides a method whereby any kind of turpentine oil, such, for example, as sulfate turpentine oil, pine oil, or extraction turpentine oil can be used as raw material in the production of maleic acid of satisfactory purity. The sulfate turpentine oil which is an inexpensive by-product of the sulfate process in the cellulose manufacture is especially appropriate and readily available.

The turpentine oils under consideration are of complicated molecular structure, combining both the cylic and side chain arrangements. Because of this complex molecular structure, it was hardly to be expected that by a relatively simple procedure a conversion to maleic acid with a good yield of maleic acid could be obtained and especially by a relatively simple procedure.

It has been discovered, however, in accordance with the present invention that these turpentine oils can be oxidized to produce maleic acid by a reaction carried on in the vapor phase at temperatures of the order of 250 to 500° C.

In accordance with the preferred embodiment of the invention these oils in vaporous condition are reacted with oxygen in the presence of oxidation catalysts which favor the oxidation reaction. Air may effectively be used as the source of oxygen and the reaction is improved if a considerable excess of air over that theoretically required for the reaction is present. For example the air mixed with the vapors of the turpentine oil may be of the order of 10 to 50 times that necessary to supply the oxygen taking part in the reaction.

Various catalysts may be used. Particularly suitable are the oxides of poly-valent metals which form more or less stable compounds in several stages of oxidation and are of acid character as, for example, vanadic acid and its salts such as copper-, silver-, tin- and bismuth-vanadiate. Oxides of molybdenum, wolframite, uranium, manganese, tin and the like may also be used. Also, these metal oxides may be combined with vanadium oxides to provide a suitable catalyst. As activating addition oxides of nickel, thorium, iron, copper, bismuth, cobalt, etc. have proved to be of considerable value, the effectiveness of the catalyst can be improved by the addition of inorganic oxygen acids such as boric and phosphoric acid.

Economy of the catalysts and a greater exposed surface can be obtained by applying the catalysts to suitable carriers, as for example, aluminum gravel, porcelain, asbestos, pumice stone, diatomaceous earth, clay and the like. The catalysts may also be combined with zeolite and similar substances.

In order to avoid too violent a reaction the oxygen supplied for reaction can be diluted with inert gases such as nitrogen, water vapor and the like. These gases are sufficiently inert to the material present in the reaction chamber.

The reaction conditions can be considerably varied. Certain advantages are obtained by causing the reaction to occur at slightly super-atmospheric pressures. The time of the reaction depends upon the conditions such as the kind and effectiveness of the catalysts, the temperature in the reaction chamber and the concentration of the starting material.

If catalysts which cause a reduction of the temperature during reaction such as tin salts are employed, lower temperatures may satisfactorily be maintained in the reaction chamber. Ordinarily, however, the temperature of the reaction should be of the order of 250 to 500° C. Probably temperatures of 340 to 440° C. represent the best convenient temperatures for commercial operation. The temperature may to advantage be maintained between 350 to 400° C. as in the example hereinafter described.

When a large excess of air, as for example 10 to 50 times that necessary to supply oxygen for the reaction, is used, the range of temperature can be extended from the figures above indicated while still obtaining effective yields. It is, therefore, possible to operate the process successfully without the necessity for complicated equipment for automatically maintaining an exact desired temperature.

*Example.*—Sulfate turpentine oil is sprayed (atomized) into the reaction chamber at a temperature above 200° C. where it is mixed with hot air and passed in contact with a catalyst heated to 350 to 400° C. The catalyst may consist of vanadic acid on porcelain fragments and may be activated with thorium oxide and phosphoric acid. The volume of the air may approximate 100 cubic meters per kilogram of oil and its temperature as supplied should be such as to keep the temperature in the reaction chamber within the limits indicated.

The maleic acid, or the maleic acid anhydride which also may be formed in the reaction, is washed from the reaction gases by means of water, as for example in a water tower.

The foregoing particular description is illustrative merely and not intended as defining the limits of the invention.

I claim—

1. The method of producing maleic acid which comprises mixing turpentine oil vapor with air in excess of that required for the re-action and contacting the mixture with an oxidizing catalyst selected from the group consisting of the oxides of vanadium, molybdenum, tungsten, uranium, manganese, and tin having acid character and the metal salts of the acids of said oxides to oxidize the turpentine oil to maleic acid.

2. The method of producing maleic acid, as defined in claim 1, wherein the re-action is conducted at super atmospheric pressure.

3. The method of producing maleic acid which comprises mixing turpentine oil vapor with air in excess of that required for the re-action and contacting the mixture with an oxidizing catalyst selected from the group consisting of the oxides of vanadium, molybdenum, tungsten, uranium, manganese, and tin having acid character and the metal salts of the acids of said oxides together with an activating agent selected from the group consisting of the oxides of nickel, thorium, iron, copper, bismuth and cobalt to oxidize the turpentine oil to maleic acid.

4. The method of producing maleic acid which comprises mixing turpentine oil vapor with air in excess of that required for the re-action and contacting the mixture with an oxidizing catalyst selected from the group consisting of the oxides of vanadium, molybdenum, tungsten, uranium, manganese, and tin having acid character and the metal salts of the acids of said oxides together with an inorganic acid selected from the group consisting of boric and phosphoric acids to oxidize the turpentine oil to maleic acid.

5. The method of producing maleic acid, as defined in claim 1, wherein the temperature of the re-action is between about 350 and about 400° C.

6. The method of producing maleic acid, as defined in claim 1, wherein the temperature of the re-action is between about 340 and about 440° C.

7. The method of producing maleic acid which comprises mixing turpentine oil vapor with air in excess of that required for the reaction and contacting the mixture with an oxidizing catalyst heated to approximately 350 to 400° C., said catalyst consisting of vanadic acid on porcelain fragments activated with thorium oxide and phosphoric acid, the volume of the air approximating 100 cubic metres per kilogram of oil vapor.

8. The method of producing maleic acid which comprises reacting turpentine oil in the vapor phase mixed with oxygen of the order of ten to fifty times that necessary for the re-action at a temperature of 250 to 500° C. in the presence of an oxidizing catalyst selected from the group consisting of the oxides of vanadium, molybdenum, tungsten, uranium, manganese and tin having acid character and the metal salts of the acids of such oxides.

9. The method of producing maleic acid which comprises reacting turpentine oil in the vapor phase with oxygen at a temperature of 250 to 500° C. in the presence of a catalyst comprising a metal salt of vanadic acid.

WALTHER SCHRAUTH.